United States Patent Office 3,216,950
Patented Nov. 9, 1965

3,216,950
COMPOSITION FOR CHROMATE ANALYSIS
Victor M. Marcy and Sally L. Halstead, Pittsburgh, Pa., assignors to Calgon Corporation, a corporation of Pennsylvania
No Drawing.  Filed Apr. 11, 1963, Ser. No. 272,195
3 Claims.  (Cl. 252—408)

This invention relates to colorimetric analysis for chromate and more particularly to stable reagents therefor and methods of using same.

The best known and most widely used indicator for chromate is 1,5-diphenylcarbohydrazide (hereinafter called DPCH), which forms a pink or reddish-violet color in the presence of chromate ion. The intensity of color formed in a test solution treated by a known amount of DPCH is proportional to the concentration of chromate ion in it. No more useful indicator for chromate has been found.

A great disadvantage to the use of DPCH as an indicator, however, has been its instability in virtually all media heretofore used as a solvent for it. The exact process of degradation is not particularly important for our purposes. The difficulty is than conventional indicator solutions of DPCH perform differently depending on their age. It has not been possible to obtain dependably accurate results from stock solutions of DPCH which have been prepared in the manner of the prior art and left standing for any length of time. See the discussions of the problem by Urone, 27 Anal. Chem. 1354 (1955) and Allen, 30 Anal. Chem. 447 (1958). Indicator solutions must be prepared fresh daily, an inconvenience in routine analytical laboratories which is likely to introduce untraceable errors. Completely automatic continuous stream colorimetric analyzers now achieving wide use for monitoring many substances are not as versatile as has been desired because of the instability of standard chromate indicator solution. The best stability of indicator solution heretofore has been obtained by dissolving the indicator in pure acetone. The acetone solution must, however, be stored in a refrigerator, in a dark bottle, and be prepared fresh at least once a week. Acetone is damaging to the plastic tubing used for reagents in automatic continuous analyzers.

We have found that the use of glycerine or related polyhydric alcohol as defined herein as the solvent for DPCH enables the preparation of an indicator solution for chromate having hitherto unrealized stability.

An excellent indicator solution can be prepared, for example, by dissolving 2.5 g. of DPCH in 750 ml. of glycerine heated to about 110° C. Fifty ml. of 85% orthophosphoric acid is then added and the mixture diluted to one liter with distilled water.

Such a solution was prepared and tested for stability with the results shown in Table I. In this demonstration, 2.5 ml. of DPCH indicator solution prepared as above and aged the number of days shown in the table were added to 50 ml. each of a blank of distilled water and a test solution of water containing 0.5 p.p.m. $CrO_4$. The results are expressed as absorbance of light. Units are those normally used with the instrument, e.g. the log of the reciprocal of the percent transmittance compared compared to a distilled water standard in the device. All measurements in the tables throughout the specification were made 10 minutes after addition of the indicator solution with a Bausch & Lomb "Spectronic 20" at 540 mμ in a one-inch cell, using distilled water as the reference solution. The indicator solution was stored in the open in a clear bottle at room temperature.

TABLE I

Stability of indicator

| Days after Preparation | Absorbence | |
|---|---|---|
| | Blank | 0.5 p.p.m. $CrO_4$ Standard |
| 0 | 0.010 | 0.375 |
| 3 | 0.005 | 0.375 |
| 4 | 0.005 | 0.375 |
| 5 | 0.005 | 0.370 |
| 6 | 0.005 | 0.375 |
| 7 | 0.005 | 0.375 |
| 10 | 0.020 | 0.375 |
| 11 | 0.010 | 0.375 |
| 14 | 0.010 | 0.380 |
| 24 | 0.030 | 0.380 |
| 33 | 0.035 | 0.380 |
| 41 | 0.035 | 0.395 |
| 47 | 0.025 | 0.375 |
| 54 | 0.040 | 0.375 |
| 61 | 0.030 | 0.375 |
| 68 | 0.030 | 0.390 |
| 95 | 0.030 | 0.375 |
| 115 | 0.030 | 0.380 |
| 136 | 0.030 | 0.375 |
| 211 | 0.050 | 0.375 |

In Tables II through VIII, various indicator solutions are employed. Their compositions are as follows:

Reagent #1:
  750 ml. glycerine (reagent grade), 2.5 g. DPCH—Heated to 110° C.

Reagent #2:
  750 ml. glycerine (technical grade), 2.5 g. DPCH—Heated to about 150° C.

Reagent #3:
  750 ml. glycerine (technical grade), 2.5 g. DPCH—Heated to about 150° C.
  50 ml. $H_3PO_4$ (85%) solution Reagent #4:
  750 ml. glycerine (technical grade), 2.5 g. DPCH—Heated to 110° C.

Reagent #5:
  750 ml. glycerine (reagent grade), 2.5 g. DPCH—Heated to about 150° C.
  ½ ml. N/2 HCl Reagent #6:
  500 ml. glycerine (reagent grade), 2.5 g. DPCH—Heated to 110° C.
  50 ml. $H_3PO_4$ (85%) solution
  Add isopropyl alcohol to fill to 1 liter (about 450 ml.)

Reagent #7:
  750 ml. glycerine (reagent grade), 2.5 g. DPCH—Heated to 110° C.
  50 ml. $H_3PO_4$ (85%) solution
  Add isopropyl alcohol to fill to 1 liter (about 200 ml.)

Reagent #8:
  750 ml. ethylene glycol, 2.5 g. DPCH—Heated to 70° C.
  50 ml. $H_3PO_4$ (85%) solution
  Add water to fill to 1 liter Reagent #9:
  750 ml. propylene glycol, 2.5 g. DPCH—Heated to 70° C.

50 ml. $H_3PO_4$ (85%) solution
Add water to fill to 1 liter

Reagent #10:
  500 ml. glycerine (reagent grade), 2.5 g. DPCH—
    Heated to 110° C.
  50 ml. $H_3PO_4$ (85%) solution
  About 450 ml. (fill to 1 liter) water Reagent #11:
  About 95 ml. (fill to 100 ml.) acetone, 0.25 DPCH—
  5 ml. $H_3PO_4$ (85%) solution Tables II through VIII demonstrate the effect of our invention under various circumstances. The number of days storage of the indicator solution is shown for each test in each table. In the case of those reagents (#1, 2, 4, and 5) which were not prepared with phosphoric acid, phosphoric acid was added immediately before each test by adding 5 ml. of $H_2PO_4$ (85%) to 75 ml. of reagent solution, and diluting the mixture to 100 ml. with distilled water. Eighty ml. of reagent #3 were diluted to 100 ml. with distilled water. The indicator solutions thus prepared, and the indicator solutions which included phosphoric acid during storage (#6–11), were used in the same manner as for Table I, e.g. 2.5 ml. of indicator solution were added to 50 ml. of test solution and control blank. The test solution contained 0.5 p.p.m. $CrO_4$ and the control was distilled water.

TABLE II

*Absorbance of test solution after treatment by indicator— Effect of storage on indicator solution*

| Test Solution | Days' Storage | | | | |
|---|---|---|---|---|---|
| | 0 | 17 | 31 | 72 | 142 |
| Reagent #1: | | | | | |
| Blank | 0.000 | 0.000 | 0.000 | 0.000 | 0.005 |
| 0.5 p.p.m. $CrO_4$ | 0.365 | 0.365 | 0.365 | 0.370 | 0.375 |
| Reagent #2: | | | | | |
| Blank | 0.000 | 0.000 | 0.000 | 0.000 | 0.010 |
| 0.5 p.p.m. $CrO_4$ | 0.370 | 0.370 | 0.370 | 0.370 | 0.375 |
| Reagent #3: | | | | | |
| Blank | 0.000 | 0.000 | 0.000 | 0.015 | 0.025 |
| 0.5 p.p.m. $CrO_4$ | 0.370 | 0.365 | 0.370 | 0.345 | 0.335 |
| Reagent #4: | | | | | |
| Blank | 0.000 | 0.005 | 0.010 | 0.005 | 0.005 |
| 0.5 p.p.m. $CrO_4$ | 0.370 | 0.370 | 0.365 | 0.370 | 0.365 |
| Reagent #5: | | | | | |
| Blank | 0.000 | 0.000 | 0.000 | 0.005 | 0.005 |
| 0.5 p.p.m. $CrO_4$ | 0.370 | 0.370 | 0.375 | 0.375 | 0.375 |

TABLE III

*Absorbance of test solution after treatment by indicator— Effect of storage on indicator solution*

| Test Solution | Days' Storage | | | | |
|---|---|---|---|---|---|
| | 0 | 4 | 14 | 31 | 89 |
| Reagent #6: | | | | | |
| Blank | 0.0 | 0.005 | 0.01 | 0.005 | 0.01 |
| 0.5 p.p.m. $CrO_4$ | 0.365 | 0.365 | 0.370 | 0.370 | 0.345 |

TABLE IV

*Absorbance of test solution after treatment by indicator— Effect of storage on indicator solution*

| Test Solution | Days' Storage | | | | |
|---|---|---|---|---|---|
| | 0 | 3 | 10 | 20 | 37 | 98 |
| Reagent #7: | | | | | | |
| Blank | 0.005 | 0.005 | 0.005 | 0.005 | 0.005 | 0.01 |
| 0.5 p.p.m. $CrO_4$ | 0.365 | 0.375 | 0.375 | 0.375 | 0.370 | 0.365 |

TABLE V

*Absorbance of test solution after treatment by indicator— Effect of storage on indicator solution*

| Test Solution | Days' Storage | | | | | |
|---|---|---|---|---|---|---|
| | 0 | 2 | 5 | 22 | 39 | 97 |
| Reagent #8: | | | | | | |
| Blank | 0.005 | 0.005 | 0.01 | 0.02 | 0.02 | 0.04 |
| 0.5 p.p.m. $CrO_4$ | 0.365 | 0.355 | 0.345 | 0.335 | 0.345 | 0.345 |

TABLE VI

*Absorbance of test solution after treatment by indicator— Effect of storage on indicator solution*

| Test Solution | Days' Storage | | | | | | |
|---|---|---|---|---|---|---|---|
| | 0 | 12 | 13 | 16 | 23 | 33 | 49 | 106 |
| Reagent #9: | | | | | | | | |
| Blank | 0.01 | 0.02 | 0.02 | 0.025 | 0.03 | 0.04 | 0.04 | 0.065 |
| 0.5 p.p.m. $CrO_4$ | 0.330 | 0.305 | 0.295 | 0.300 | 0.285 | 0.290 | 0.280 | 0.275 |

TABLE VII

*Absorbance of test solution after treatment by indicator— Effect of storage on indicator solution*

| Days after Preparation | Reagent #10 | |
|---|---|---|
| | Test Solution, Blank | Test Solution, 0.5 p.p.m. $CrO_4$ |
| 0 | 0.001 | 0.375 |
| 1 | 0.010 | 0.375 |
| 2 | 0.010 | 0.375 |
| 3 | 0.020 | 0.375 |
| 6 | 0.020 | 0.380 |
| 7 | 0.025 | 0.385 |
| 8 | 0.025 | 0.385 |
| 9 | 0.025 | 0.385 |
| 10 | 0.030 | 0.395 |
| 13 | 0.035 | 0.390 |
| 14 | 0.035 | 0.395 |
| 17 | 0.030 | 0.395 |
| 27 | 0.045 | 0.390 |
| 36 | 0.050 | 0.410 |
| 41 | 0.045 | 0.435 |
| 44 | 0.045 | 0.425 |
| 50 | 0.030 | 0.410 |
| 57 | 0.050 | 0.415 |

TABLE VIII

*Absorbance of test solution after treatment by indicator— Effect of storage on indicator solution*

| Test Solution | Days' Storage | | | | | | |
|---|---|---|---|---|---|---|---|
| | 0 | 5 | 8 | 12 | 14 | 22 | 29 |
| Reagent #11 Stored in Clear Bottle: | | | | | | | |
| Blank | 0.000 | 0.010 | 0.005 | 0.010 | 0.015 | 0.025 | 0.030 |
| 0.5 p.p.m. $CrO_4$ | 0.375 | 0.390 | 0.335 | 0.325 | 0.315 | 0.265 | 0.245 |
| Reagent #11 Stored in Amber Bottle: | | | | | | | |
| Blank | 0.000 | 0.010 | 0.005 | 0.015 | 0.010 | 0.030 | 0.045 |
| 0.5 p.p.m. $CrO_4$ | 0.380 | 0.395 | 0.345 | 0.335 | 0.330 | 0.290 | 0.275 |

It will be immediately apparent from the above tables that our invention achieves far greater stability than was hitherto possible with the best prior art indicator solvent, acetone.

Any liquid polyhydric alcohol may be used as the solvent for DPCH. Among the useful polyhydric alcohols may be mentioned, in addition to glycerine, ethylene glycol, and propylene glycol, 1,2,4-butanetriol, 1,2,6-hexanetriol, 1,3-butylene glycol, 2,5-hexanediol, 1,5-pentanediol, 2-butyne-1,4-diol, 1,2-propanediol, 1,3-propanediol, 2,3-butanediol. In addition, there are a number of liquid long-chain polymer polyols which may be used. We may use any liquid polyhydric alcohol in our invention.

The polyol-DPCH solutions are compatible with water and lower alcohols, and indicator solutions of greater stability than heretofore possible with water alone may be obtained by the use of even small amounts of polyhydric alcohol. The addition of a small amount (i.e. 10%) of glycerine to an aqueous solution of DPCH will improve the stability to a small degree. Less than about 10% polyol in water generally does not extend the life of the solution a practically advantageous time. A pure glycerine solution of DPCH may be diluted when prepared or at the time of use after storage with large or small proportions of water or lower mono-alcohol within the scope of our invention.

A saturated solution of DPCH in glycerine is reached at about 2 to 2½%. Heating to about 150° C. is required to achieve this, however. Heating beyond about 150° C. either in a medium of glycerine or any other polyhydric alcohol is not advisable since such higher temperatures tend to accelerate decomposition of the indicator. Heating over about 150° C. to dissolve more than 2 to 2½% DPCH of course results in supersaturation and settling out on cooling, as well as decomposition. A saturated solution is quite operable in our invention however.

Various other acids, such as oxalic, sulfuric, or hydrochloric acids, may be substituted for phosphoric acid, as is known in the art. The proper amount of acid in the test solution after addition of the indicator solution should be such as will result in a pH of about 1 to about 2.5, as also is known.

Our invention may be defined as a composition useful as an indicator for chromate comprising a polyhydric alcohol and DPCH. By chromate, we mean, as is known in the art of analytical chemistry, either the $Cr_2O_7$ form or the $CrO_4$ form. Elemental chromium may be oxidized to one of these forms for the determination of chromium.

We claim:

1. A stable composition useful as a colorimetric indicator for chromate consisting essentially of (a) about ¼% to about 2½% 1,5 diphenylcarbohydrazide, (b) sufficient acid selected from the group consisting of oxalic, sulfuric, hydrochloric, and phosphoric to yield a pH of about 1 to about 2.5, and (c) the balance a solvent medium consisting essentially of liquid polyhydric alcohol and no more than about 90% water by weight.

2. A stable composition useful as a colorimetric indicator for chromate consisting essentially of a solution of at least about ¼% 1,5 diphenylcarbohydrazide in a solvent of liquid polyhydric alcohol and up to about 90% water.

3. A composition of claim 1 in which the liquid polyhydric alcohol is glycerine.

References Cited by the Examiner

UNITED STATES PATENTS 3,079,343  2/63  Bernard _____ 252—408 XR

OTHER REFERENCES

Lange's Handbook of Chemistry, 3rd Ed., 1939, page 360.

"Diphenylcarbazide as a Test for Chromium," Stover, Jour. Amer. Chem. Soc., vol. 50, September 1928, p. 2363.

JULIUS GREENWALD, *Primary Examiner.*